United States Patent
Schilling et al.

(10) Patent No.: US 8,077,780 B2
(45) Date of Patent: Dec. 13, 2011

(54) POWER CONTROL IN A MULTICARRIER COMMUNICATIONS SYSTEM

(75) Inventors: Donald L. Schilling, Palm Beach Gardens, FL (US); Joseph Garodnick, Centerville, MA (US)

(73) Assignee: Linex Technologies, Inc. DE (US)

( * ) Notice: Subject to any disclaimer, the term of this patent is extended or adjusted under 35 U.S.C. 154(b) by 922 days.

(21) Appl. No.: 11/405,370

(22) Filed: Apr. 17, 2006

(65) Prior Publication Data

US 2007/0242762 A1    Oct. 18, 2007

(51) Int. Cl.
*H04K 1/10* (2006.01)
*H04L 27/28* (2006.01)

(52) U.S. Cl. ......... 375/260; 375/316; 375/324; 375/340

(58) Field of Classification Search ........... 375/260, 375/316, 340, 324
See application file for complete search history.

(56) References Cited

U.S. PATENT DOCUMENTS

| | | | |
|---|---|---|---|
| 2005/0141598 A1* | 6/2005 | Akita | 375/148 |
| 2005/0202818 A1* | 9/2005 | Hondo et al. | 455/434 |

* cited by examiner

*Primary Examiner* — Ted Wang

(57) ABSTRACT

An improvement to multi-carrier communication, such as an OFDM and MC-CDMA system, where in a multipath or phase distorted channel, the received signal is flat with respect to frequency and linear with respect to phase. A first unit transmits a plurality of multi-carrier signals, which include unmodulated carrier signals. A second unit receives the plurality of multi-carrier signals, and determines the in-phase and quadrature amplitudes or powers of the unmodulated carrier signals of the received multi-carrier signal. The second unit compares the measured in-phase and quadrature amplitudes or powers of the unmodulated carrier signals to predetermined criteria, and generates adjusting data from the compared in-phase and quadrature amplitudes or powers. The first unit uses the adjusting data to pre-distort the next plurality of multi-carrier signals to be transmitted, the in-phase and quadrature amplitudes or powers of the plurality of multi-carrier signals. The first unit transmits, with the in-phase and quadrature phase adjusted per the adjusting data, the next plurality of multi-carrier signals, through the communications channel.

6 Claims, 10 Drawing Sheets

POWER CONTROL IN A MULTICARRIER COMMUNICATIONS SYSTEM

BACKGROUND OF THE INVENTION

The present invention relates to multicarrier modulation schemes including spread-spectrum, Orthogonal Frequency Division Multiplexing (OFDM), and Orthogonal Frequency Division Multiple Access (OFDMA) communications, and more particularly to a system and method to significantly improve the dynamic range, frequency reuse, capacity, and battery consumption for wireless communications through a novel automatic power control mechanism.

DESCRIPTION OF THE RELEVANT ART

In many wired and wireless communications systems, such as 3G cellular, WiFi, WiMax, etc., it is important to adjust the transmitted power level of a remote user so that multiple users will each have a more or less equal received signal power at the base station, and for a single user connection, the power adjustment is used so that the minimum power to overcome noise is transmitted. In standard frequency division duplex (FDD) systems such as spread spectrum and frequency division multiplex (OFDM) systems, the steady state power level adjustment is performed using automatic, closed-loop, power control (APC). The purpose of APC is to monitor the power or error rate received at the base station from a remote unit and to signal the remote unit to either raise or lower its transmitted power level.

For a time division duplex (TDD) system, where the transmit and receive signals are on the same frequency, open loop power control can be used at the remote user to indicate the received power at the base station. However, in a FDD system, where the downstream and upstream transmission paths are uncorrelated, the appropriate power level for the remote unit is initially unknown. Typically, the base station will communicate with the remote user and effect a change in the level of transmitted power to compensate for the distance and fading that occurs with all wireless systems.

SUMMARY OF THE INVENTION

A general object of the invention is to increase the accuracy and the dynamic range of the base station by signaling the remote user to adjust not only the power level, but to pre-distort the spectrum of the transmitted signal so that when the signal is received at the base station, the spectrum will be flat, the phase will be linear, and the level will be correct.

Another object of the invention is a closed loop system so that there is continuous adjustment, which is needed for mobile wireless systems.

The present invention provides a novel improvement to multicarrier modulation, such as Orthogonal Frequency Division Multiplexing (OFDM), Orthogonal Frequency Division Multiple Access (OFDMA), Multicarrier Code Division Multiple Access (MC-CDMA), Multicarrier Spread Spectrum CDMA (MC-SS-CDMA), Multicarrier Direct Sequence CDMA (MC-DS-CDMA), Orthogonal Frequency Division Multiplexing CDMA (OFDMA-CDMA), and Multi-tone CDMA (MT-CDMA) systems. The improvement includes a system and method for an OFDMA and MC-CDMA system and method. The improvement includes a first unit, which may be embodied as a remote unit, and a second unit, which may be embodied as a base station. Alternatively, the first unit and the second unit may be used in point to point communications, without a separate base station. The first unit transmits, through a communications channel, such as a cable or using radio waves, a plurality of multi-carrier signals on a plurality of frequencies, respectively. The plurality of multi-carrier signals includes a subset of unmodulated carrier signals. The subset of unmodulated carrier signals is distributed over the spectrum in a regular or irregular manner.

The second unit receives the plurality of multi-carrier signals on the plurality of frequencies, transmitted by the first unit. The second unit measures the in-phase and quadrature amplitudes or powers of the received unmodulated carriers of the subset of unmodulated carrier signals and compares the measured in-phase and quadrature amplitudes or powers of the received unmodulated carriers to predetermined criteria. The second unit generates adjusting data from the compared in-phase and quadrature amplitudes or powers of the received unmodulated carrier signals, and sends the adjusting data to the first unit.

The first unit uses the adjusting data to adjust the in-phase and quadrature amplitudes or powers of the next plurality of multi-carrier signals to be transmitted on the plurality of frequencies. The first unit then transmits the next plurality of multi-carrier signals, which have the adjusted in-phase and quadrature amplitudes or powers, adjusted per the adjusting data, as a plurality of adjusted multi-carrier signals.

Additional objects and advantages of the invention are set forth in part in the description which follows, and in part are obvious from the description, or may be learned by practice of the invention. The objects and advantages of the invention also may be realized and attained by means of the instrumentalities and combinations particularly pointed out in the appended claims.

BRIEF DESCRIPTION OF THE DRAWINGS

The accompanying drawings, which are incorporated in and constitute a part of the specification, illustrate preferred embodiments of the invention, and together with the description serve to explain the principles of the invention.

DETAILED DESCRIPTION OF THE PREFERRED EMBODIMENTS

Figure 1:
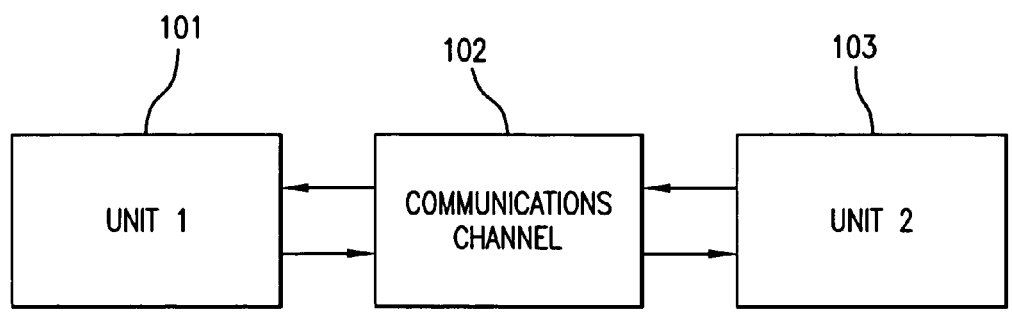
FIG. 1 shows a first unit communicating with a second unit through a communications channel.

Reference now is made in detail to the present preferred embodiments of the invention, examples of which are illustrated in the accompanying drawings, wherein like reference numerals indicate like elements throughout the several views.

The present invention provides a novel improvement to any of a multi-carrier modulation system and method such as orthogonal frequency division multiplex (OFDM), orthogonal frequency division multiple access (OFDMA), and multi-channel code-division-multiple-access (MC-CDMA), and other spread spectrum systems and methods, any of an OFDMA and MC-CDMA system and method, for the continuous automatic power level and spectrum shape adjustment of packets in a FDD system, such as a spread-spectrum system, and an OFDM/OFDMA system. The improvement, as shown in FIG. 1, includes a first unit 101, which may be embodied as a remote unit, and a second unit 103, which may be embodied as a base station. Alternatively, the first unit 101 and the second unit 103 may be used in point to point communications, without a separate base station.

Figure 2:
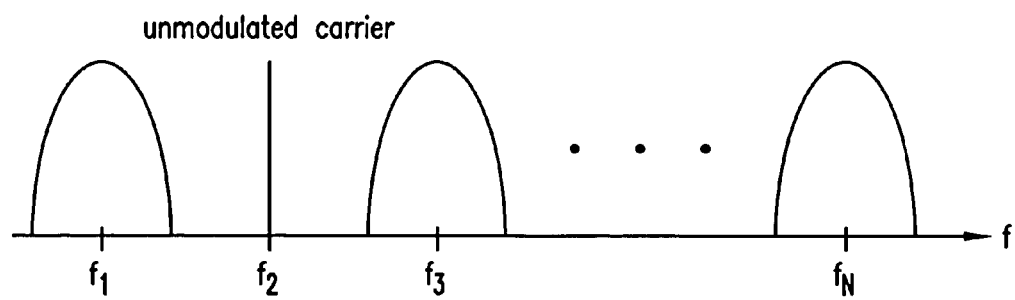
FIG. 2 illustrates a multi-carrier signal.

The first unit 101 transmits, through a communications channel 102, such as a cable or using radio waves, a plurality of multi-carrier signals on a plurality of frequencies, respectively. The plurality of multi-carrier signals includes a subset of unmodulated carrier signals, as illustrated in FIG. 2. The subset of unmodulated carrier signals is unmodulated and distributed over the transmitted spectrum in a regular or irregular manner. The first unit 101 is capable of receiving adjustment commands from the second unit 103, for example from a base station, instructing the first unit how to pre-distort its power level, spectral shape, and its phase characteristics, based on information the second unit obtained from the amplitude and phase of each of the received unmodulated carrier signals of the subset of unmodulated carrier signals transmitted from the first unit 101. The present invention does not preclude downlink power control where the first unit 101 can control the second unit 103 transmitted spectral characteristics. The second unit 103, for example a base station, receives the MC-CDMA or OFDM/OFDMA signal from the first unit 101.

The second unit 103 receives the plurality of multi-carrier signals on the plurality of frequencies. The second unit 103 measures the in-phase and quadrature amplitudes or powers each of the received unmodulated carrier signals and compares the measured in-phase and quadrature amplitudes or powers of the received unmodulated carriers to predetermined criteria. The second unit 103 typically measures the gain flatness and phase linearity by receiving, as in most receivers, in-phase and quadrature amplitudes or powers of the received signal, and detects the envelopes of the received in-phase and quadrature amplitudes or powers of the unmodulated carrier signals. The received power level is compared to a preset level. The second unit 103 generates adjusting data from the compared in-phase and quadrature amplitudes or powers of the received unmodulated carrier signals, and sends the adjusting data to the first unit 101 to adjust its power and power spectrum. This closed loop mechanism continues as long as a session is active between the first unit 101 and the second unit 103.

The first unit 101 receives the adjustment data, including power setting, and sets a level and shaping from the power data received for the first unit 101. The first unit 101 uses the adjusting data to adjust the in-phase and quadrature amplitudes or powers of the next plurality of multi-carrier signals to be transmitted on the plurality of frequencies. The first unit 101 then transmits the next plurality of multi-carrier signals, which have the adjusted in-phase and quadrature amplitudes or powers, adjusted per the adjusting data, as a plurality of adjusted multi-carrier signals.

Figure 3:
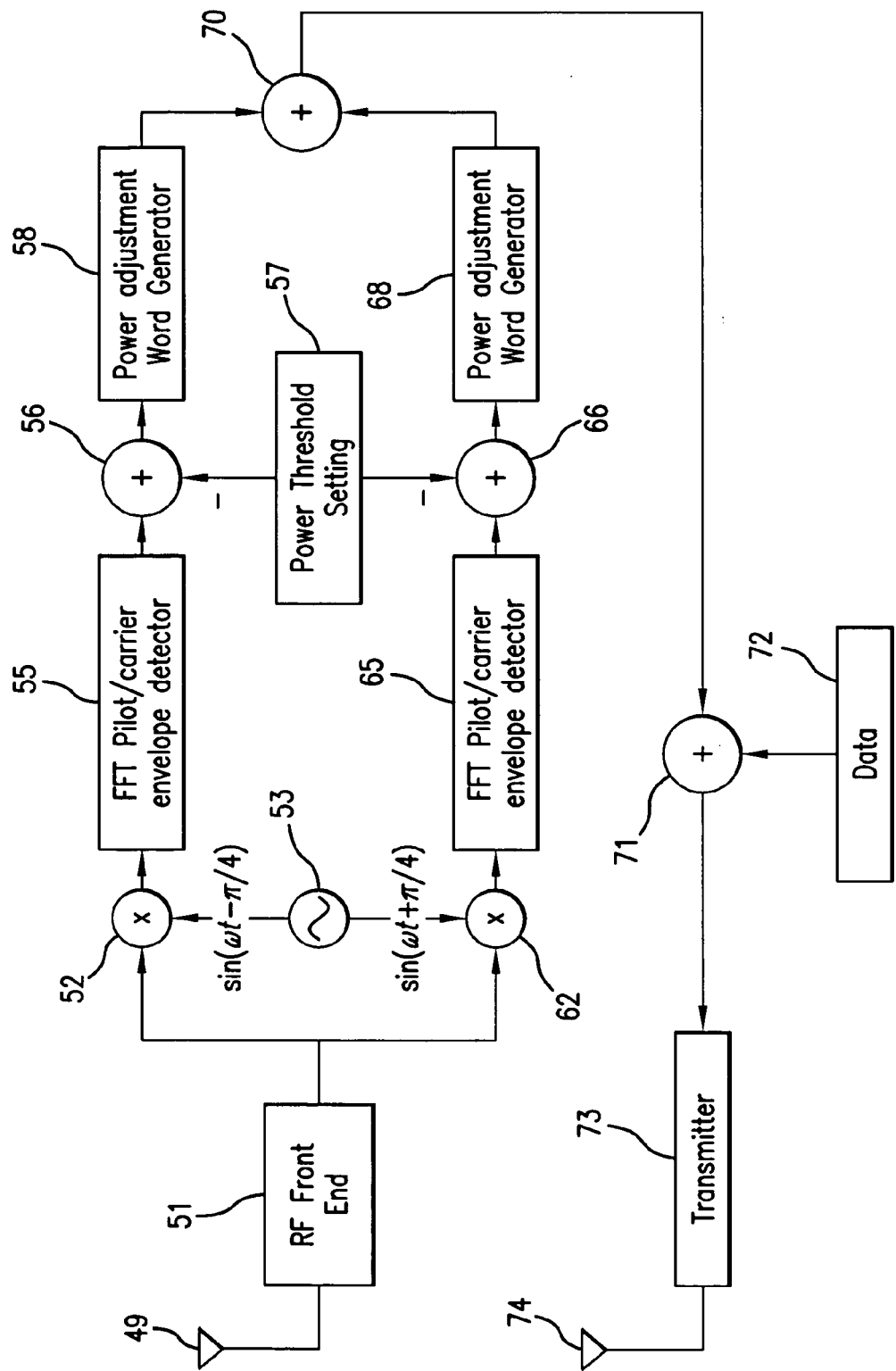
FIG. 3 shows an in-phase and quadrature received block diagram according to the invention.

FIG. 3 shows, by way of example, a block diagram of a receiver and transmitter according to the present invention. The OFDM, OFDMA, or MC-CDMA signal, at antenna 49 is amplified and filtered by RF front end 51. Signal generator 53 with mixers 52, 62 detect the envelopes of the received in-phase and quadrature amplitudes or powers. The received power level is compared 56, 66 to a preset level in power threshold setting 57. The adjusting data from power adjustment word generator 58 and power word adjustment word generator 68 are combined 70 and sent by transmitter 73 to the first unit 101 to adjust its power. Data 72 also may be combined 71 and sent to the first unit 101. This closed loop mechanism continues as long as a session is active between the first unit and the second station.

In APC mode, the adjusting data of the transmitted, adjusted in-phase and quadrature amplitudes or powers of the next plurality of multi-carrier signals, are sent to the first unit 101 to adjust signal level of the first unit 101 up or down. Bits in the downstream message to the second unit 103 are devoted to APC, for both the CDMA and OFDM cases. The next plurality of multi-carrier signals define the shape of the spectrum, where the received spectral shape can be measured using several means, such as an envelope detector for both sine and cosine, or an FFT. In OFDM, unmodulated pilot signals are used to equalize the received spectrum, so obviously these signal can be used to measure the spectral shape.

The purpose of the invention is to extend the functionality of the APC beyond the adjustment of the overall transmitted power to compensate for fading. The extension includes transmitting a compensating spectral shape and phase.

This invention measures the amplitude of a multicarrier CDMA or OFDM (or CDMA/OFDM) signal received as a function of the bandwidth and pre-distorts the transmitted signal at the first unit 101 so that it arrives flat at the receiver of the second unit 103. The feedback path in the preferred embodiment uses a delta-modulator type generated signal to individually adjust the power of the carriers up or down, although any other algorithm could work.

The present invention may operate both ways. Thus, the role of the first unit 101 and the second unit 103 may be interchanged, so, that power spectrum is pre-distorted for each unit.

If the subset of unmodulated carrier signals are used, by separating the sine and cosine amplitudes or powers in the receiver, phase distortion can also be measured. Phase distortion degrades orthogonality and contributes to inter-symbol and inter-chip distortion. In this way, by using a second bit for each sub-band carrier signal, the phase can also be adjusted. Delta modulation can be used as the method of adjustment, so that the predistortion will track the changes of the typically, time varying, channel.

If there is a benefit to equalize overall power, as in APC, there is a benefit to equalize power across the band. The largest miscalculation in capacity for CDMA was the inability to equalize power among all the users. A 3 dB APC error (+/−1.5) caused a reduction in capacity of a factor of 2.

Present day OFDM equalize at the receiver, resulting in unequal Signal to Noise Ratio (SNR) across the received band.

Figure 4:
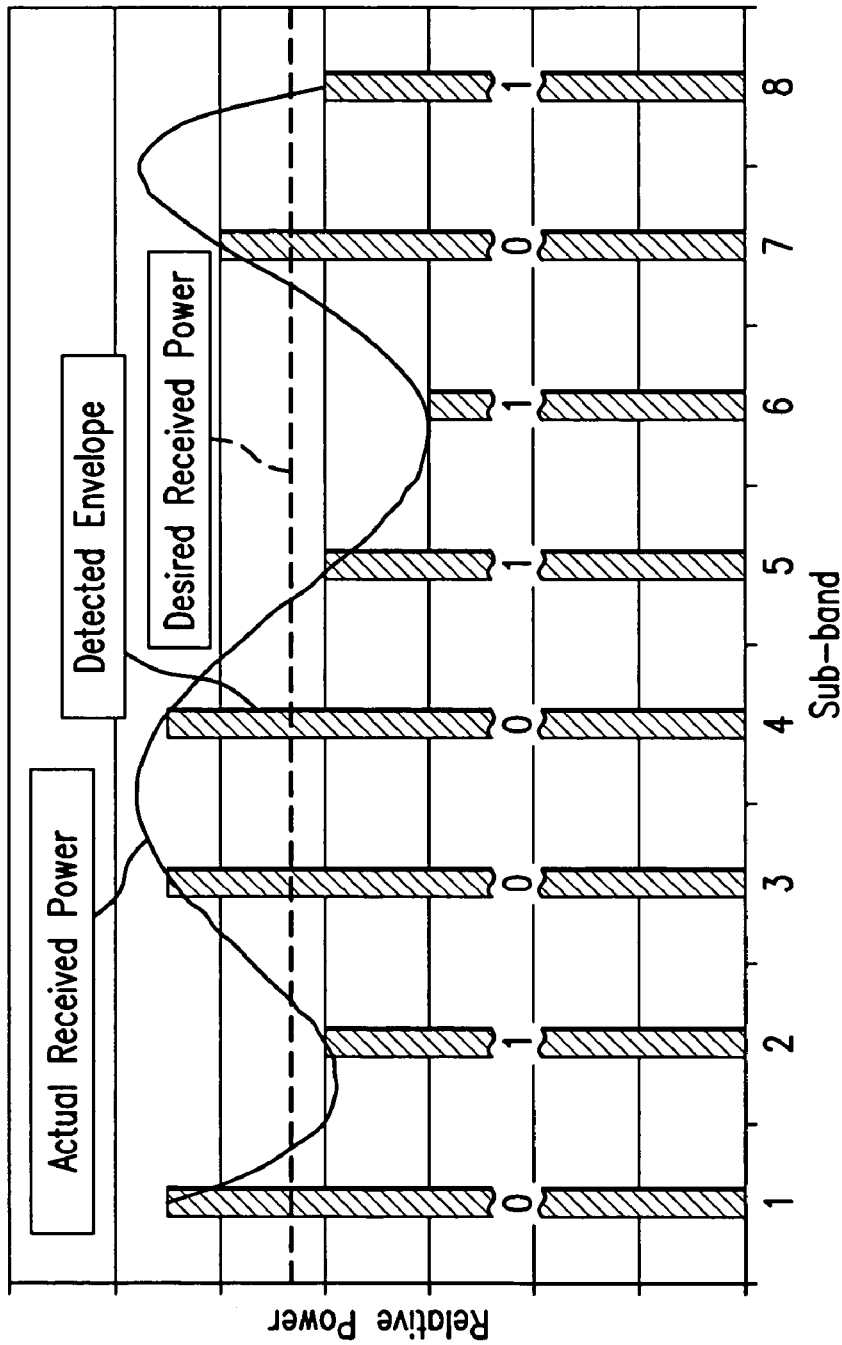
FIG. 4 illustrates an example of how APC transmits the word "4D"

The second unit 103, which may be a base station, receives and detects the envelope of the first unit 101 signal. By way of example, as shown in FIG. 4, suppose the spectrum is divided into 8 parts, sub-bandwidths, B/8. As part of the APC, the second unit 103, such as a base station, then sends back a word to the first unit 101 indicating whether to increase or decrease the first unit 101 transmitted power in each of the sub-bands. In the example chosen, the word back to the first unit 101 varies from 00 to FF (00000000-11111111), representing the decrease or increase in the pre-distortion in each of the 8 sub-bands. The APC could be linear or adaptive delta-mod as far as the meaning of "increase" or "decrease". One of these words would be sent for each quadrature component.

This way, the APC is sensitive to not only the total transmitted power, but also the non-flat fading present in most broadband wireless systems.

Figure 5:
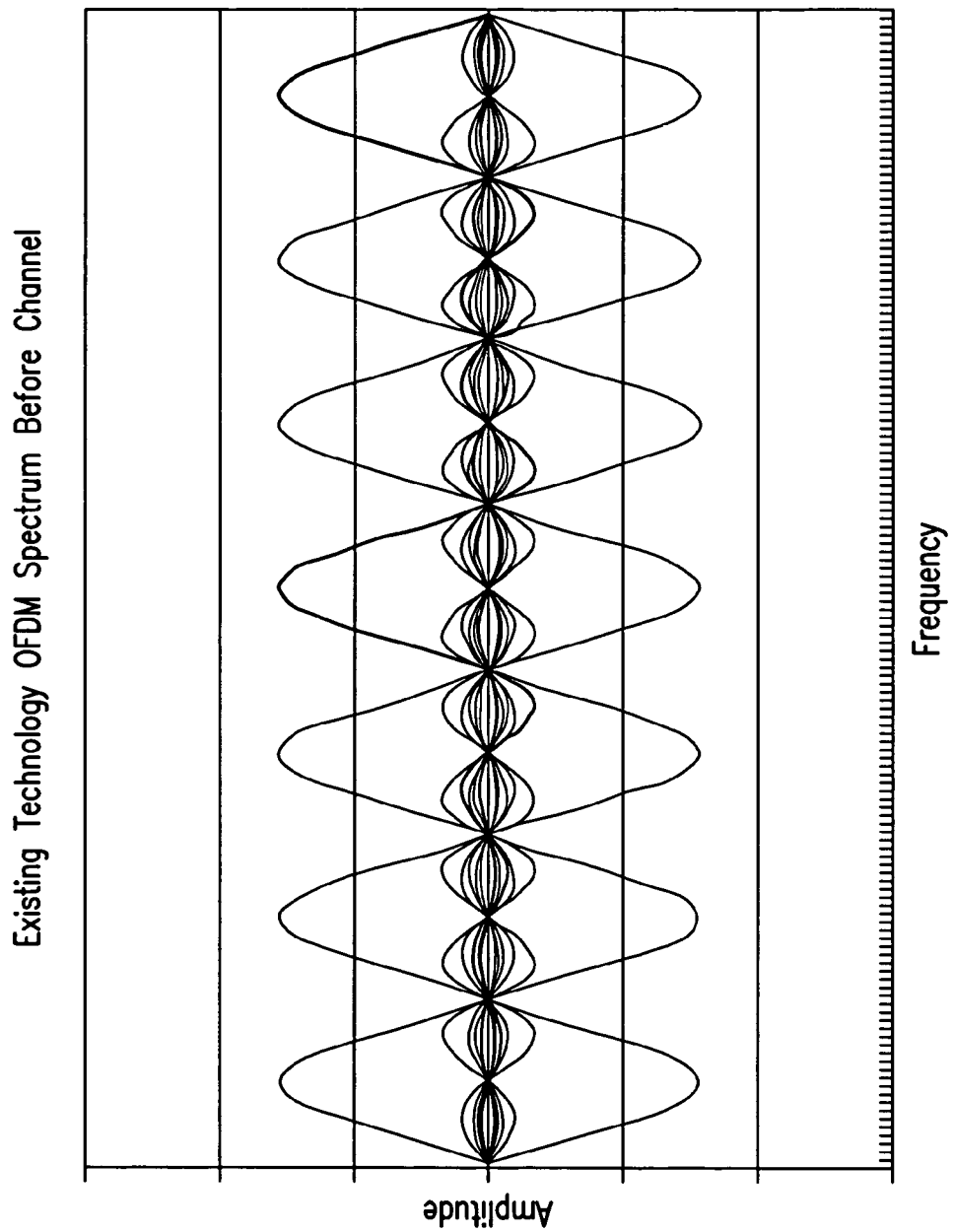
FIG. 5 illustrates existing technology OFDM spectrum before being sent over the communications channel.
Figure 6:
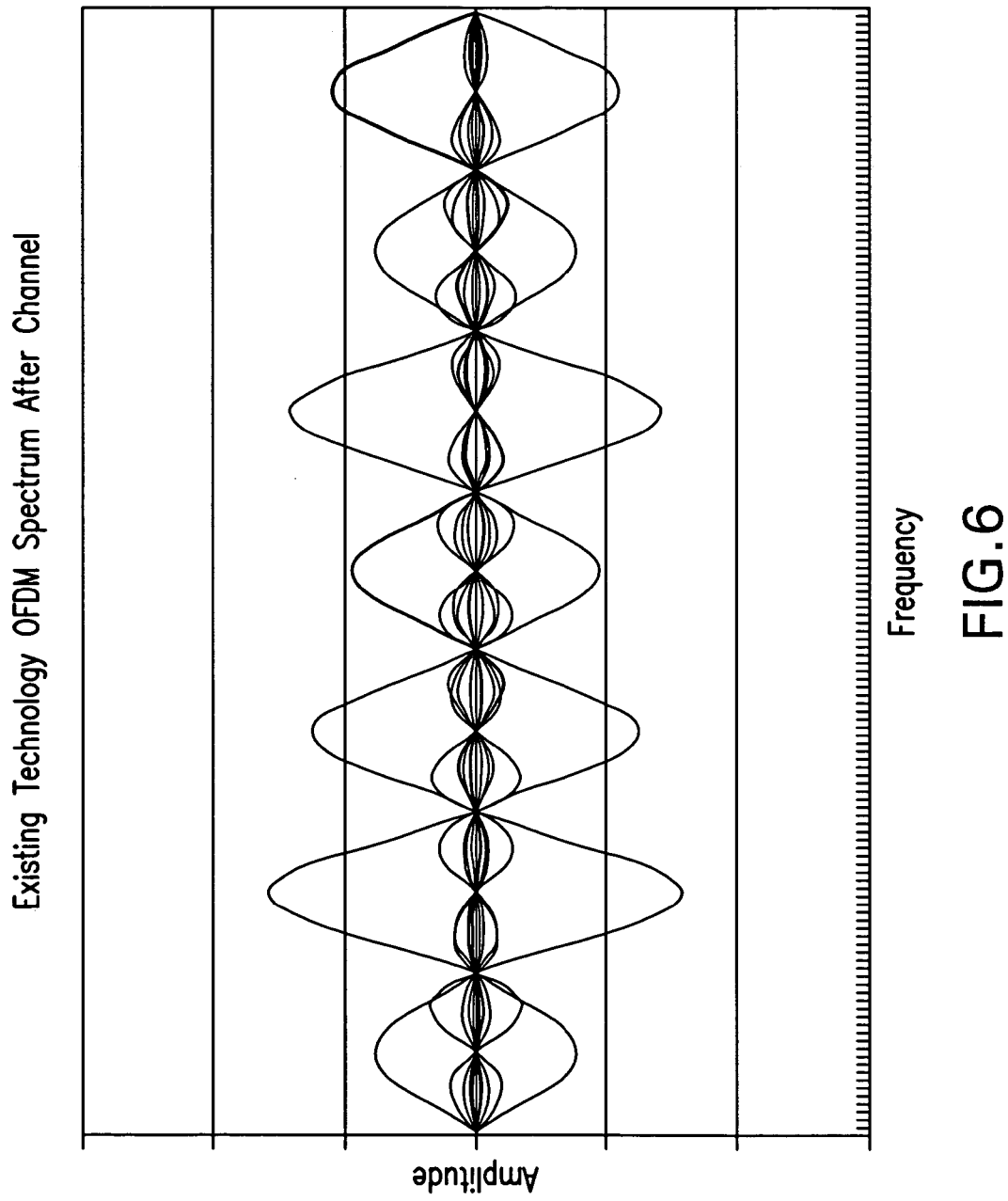
FIG. 6 illustrates existing technology OFDM spectrum after being sent over the communications channel.

The present invention increases the accuracy and the dynamic range of the base station by signaling the remote user to adjust not only the power level, but to predistort the spectrum of the transmitted signal so that when the signal is received at the base station, the spectrum will be flat, the phase will be linear, and the level will be correct. FIG. 5 illustratively shows the spectrum of an OFDM signal, using prior art technology, before being transmitted over the communications channel 102. FIG. 6 illustrates how the signal in FIG. 5 might be distorted from the communications channel 102. The distortion may be due to fading, multi-path, or other frequency and phase irregularities in the communications channel 102.

Figure 7:
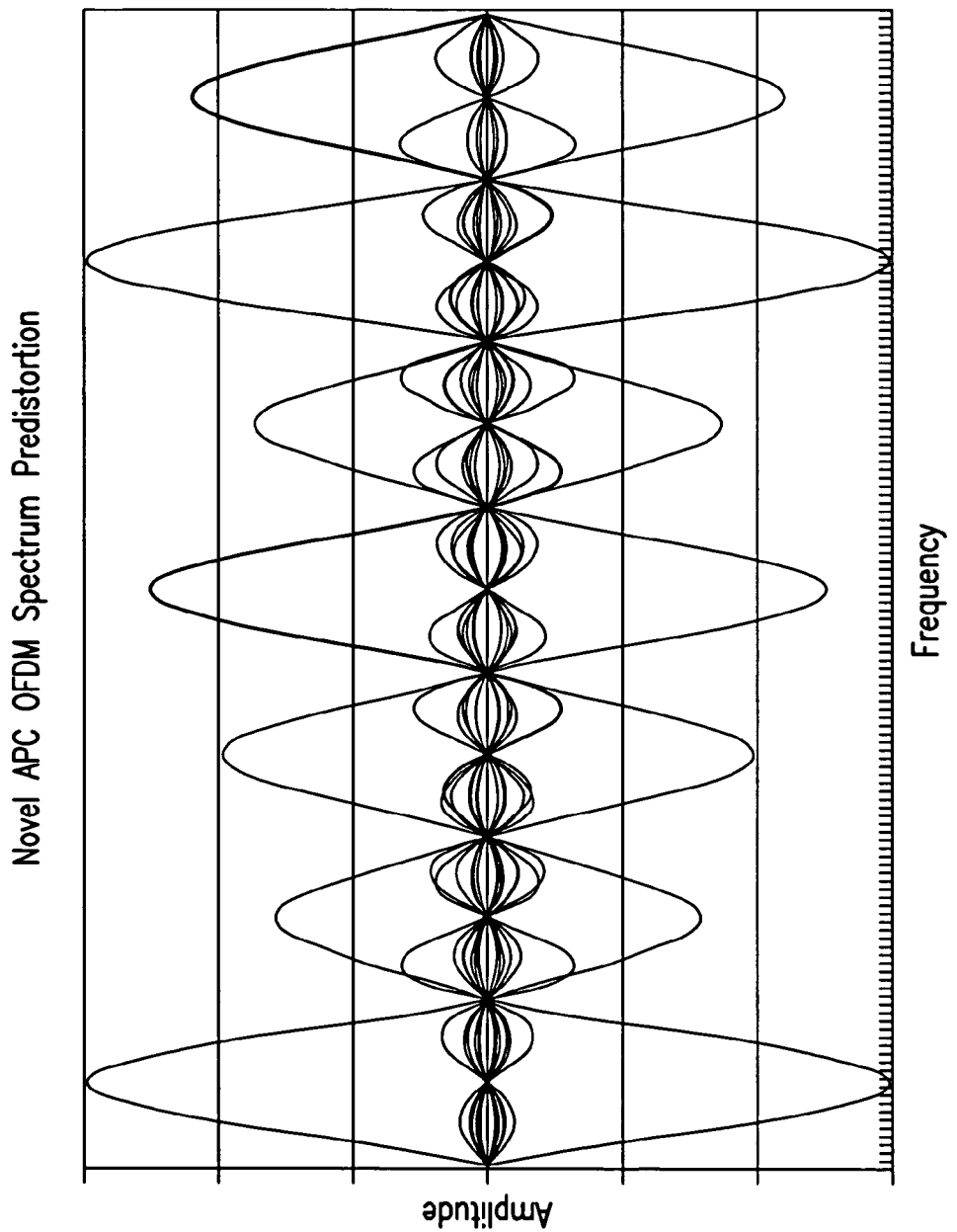
FIG. 7 shows the APC OFDM spectrum pre-distortion before being sent over the communications channel according to the present invention.
Figure 8:
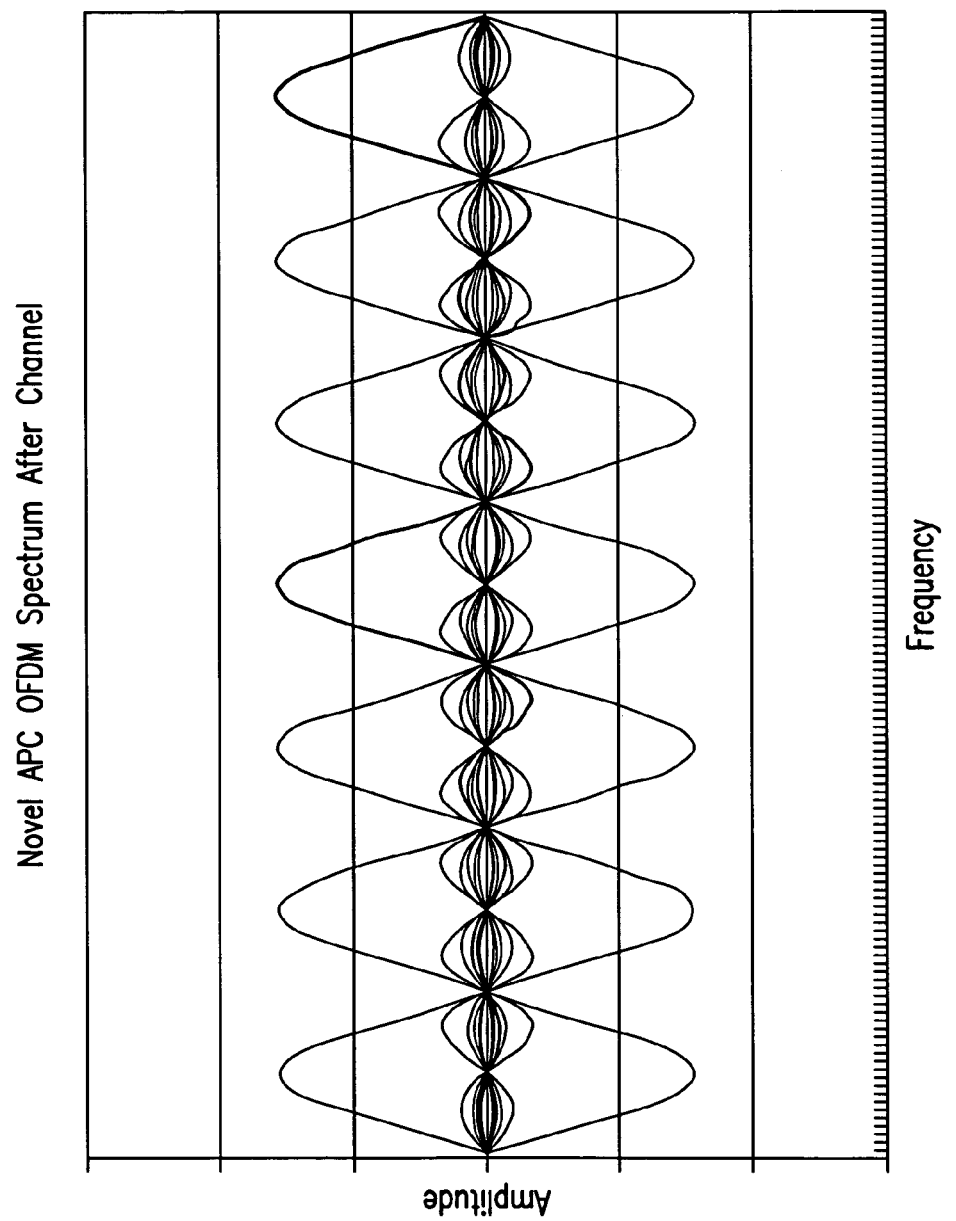
FIG. 8 illustrates the APC OFDM spectrum, previously pre-distorted, after being sent over the communications channel according to the present invention.

FIG. 7 illustrates how the spectrum of an OFDM signal might be pre-distorted for the APC according to the present invention. The spectrum is an irregular amplitude versus frequency, from the pre-distortion. After the signal of FIG. 7 passes through the communications channel, the spectrum of the signal of FIG. 7 would appear at the received as illustratively shown in FIG. 8. In FIG. 8, the spectrum has flat amplitude versus frequency.

Figure 9A:
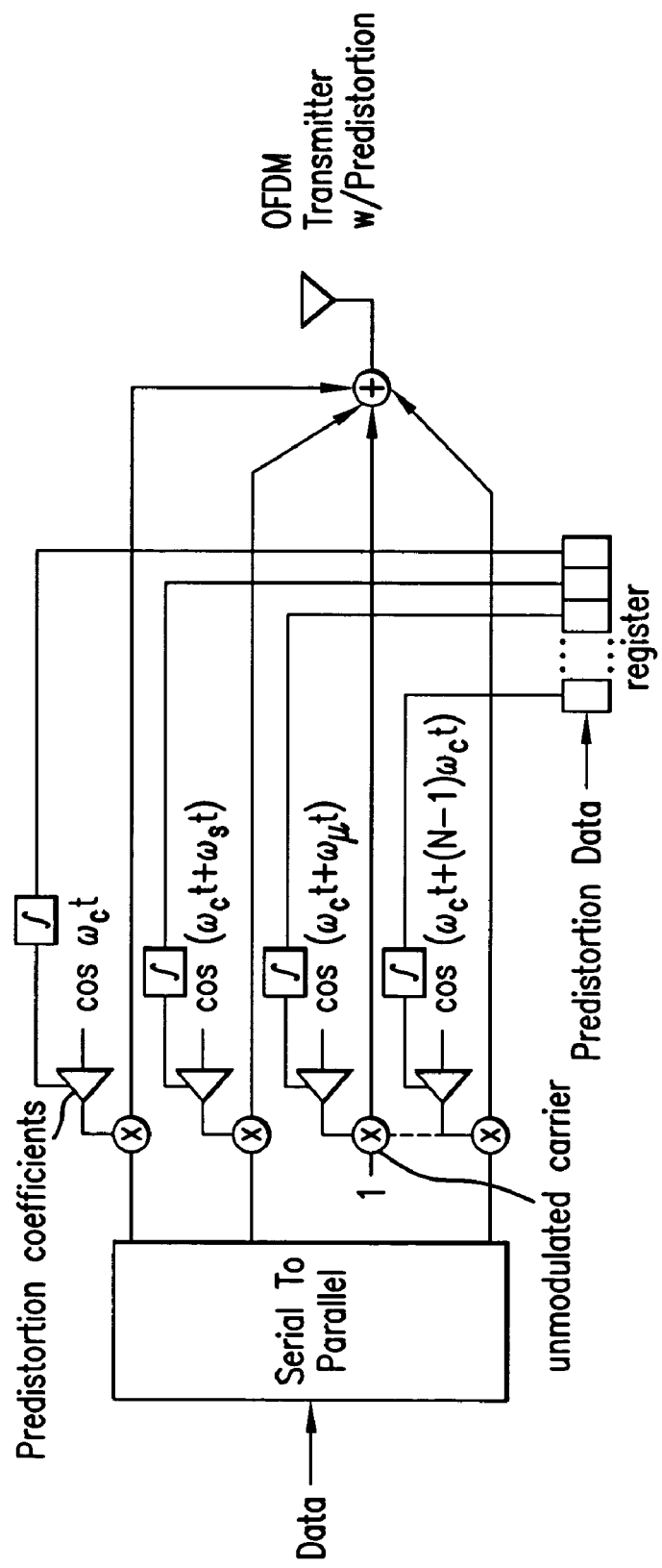
FIG. 9A is a block diagram of an OFDM transmitter with pre-distortion.
Figure 9B:
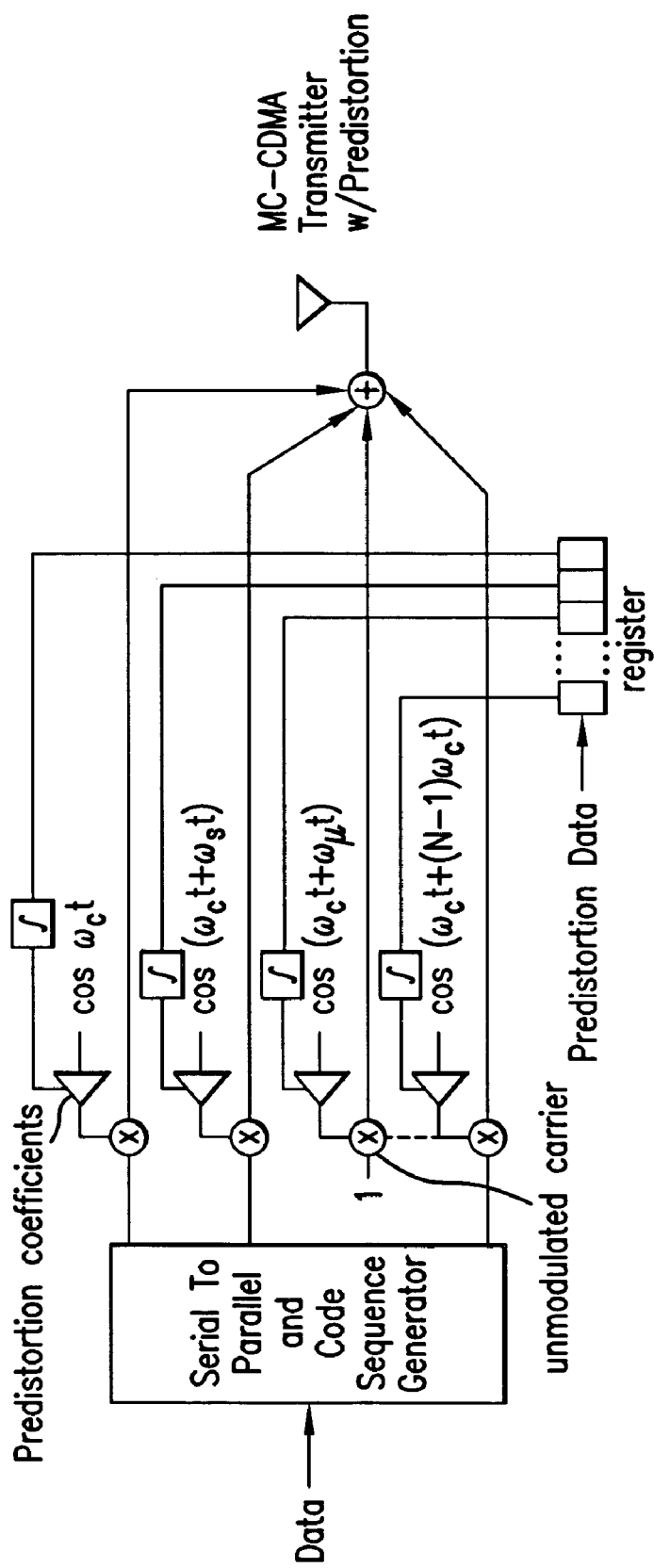
FIG. 9B is a block diagram of an MC-CDMA transmitter with pre-distortion.
Figure 10:
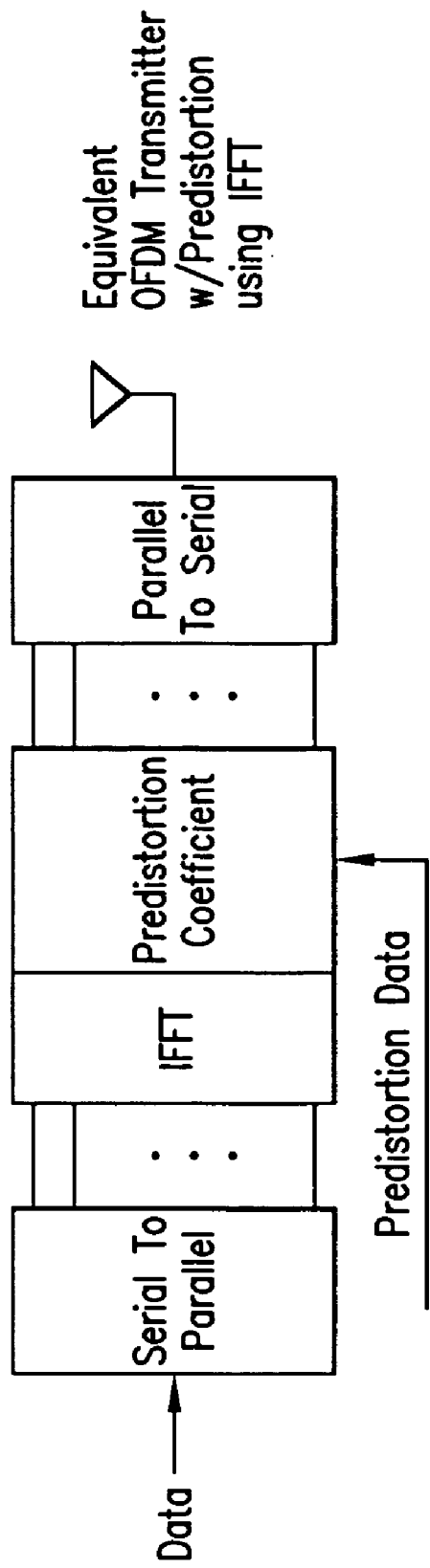
FIG. 10 is a block diagram of an equivalent OFDM transmitter with pre-distortion using IFFT.

FIGS. 9A and 9B illustrate an OFDM transmitter with pre-distortion, and an MC-CDMA transmitted with pre-distortion, respectively. Pre-distortion data in registers are used to modify the amplitudes of respective channels of the OFDM signal. An equivalent OFDM transmitter and MC-CDMA transmitter with pre-distortion using inverse fast Fourier transform (IFFT) are shown in FIGS. 9A and 9B.

The present invention uses the closed loop system so that there is continuous adjustment, which is needed for mobile wireless systems of today. For wired systems, after initialization, the APC update rate will not need continuous updating. For multi-carrier CDMA systems (MC-CDMA) and OFDM and OFDMA, the power levels of the transmitted carriers are adjusted independently, one from another. By adjusting the first unit 101 transmitted power spectrum in orthogonal space, the predistortion of the phase is also accomplished, so that the second unit 103 will receive a signal with linear phase characteristic. This is useful for reducing the inter-symbol and inter-chip interference.

It will be apparent to those skilled in the art that various modifications can be made to the improved power control in a communications system of the instant invention without departing from the scope or spirit of the invention, and it is intended that the present invention cover modifications and variations of the improved power control in a communications system provided they come within the scope of the appended claims and their equivalents.

We claim:

1. A method for improving a multi-carrier system, comprising the steps of:
    (A) transmitting, through a communications channel, a plurality of multi-carrier signals on a plurality of frequencies, with the plurality of multi-carrier signals including a subset of unmodulated carrier signals, respectively;
    (B) receiving the plurality of multi-carrier signals;
    (C) measuring in-phase and quadrature amplitudes or powers, for each received unmodulated carrier signal of the subset of the unmodulated carrier signals;
    (D) comparing the measured in-phase and quadrature amplitudes or powers of each received unmodulated carrier signal of the subset of unmodulated carrier signals to predetermined criteria;
    (E) generating adjusting data from the compared in-phase and quadrature amplitudes or powers including the step of generating pre-distorting data including from any of power level, spectral shape, and phase characteristics;
    (F) adjusting, using the adjusting data, the in-phase and quadrature amplitudes or powers for a next plurality of multi-carrier signals to be transmitted, thereby generating a plurality of adjusted multi-carrier signals; and
    (G) transmitting, with the in-phase and quadrature amplitudes or powers adjusted per the adjusting data, the next plurality of multi-carrier signals through the communications channel.

2. A method for improving a multi-carrier system, comprising the steps of:
    (A) transmitting, through a communications channel, a plurality of multi-carrier signals on a plurality of frequencies, with the plurality of multi-carrier signals including a subset of unmodulated carrier signals, respectively;
    (B) receiving the plurality of multi-carrier signals;
    (C) measuring in-phase and quadrature amplitudes or powers, for each received unmodulated carrier signal of the subset of the unmodulated carrier signals including the step of measuring gain flatness and phase linearity;
    (D) comparing the measured in-phase and quadrature amplitudes or powers of each received unmodulated carrier signal of the subset of unmodulated carrier signals to predetermined criteria;
    (E) generating adjusting data from the compared in-phase and quadrature amplitudes or powers;
    (F) adjusting, using the adjusting data, the in-phase and quadrature amplitudes or powers for a next plurality of multi-carrier signals to be transmitted, thereby generating a plurality of adjusted multi-carrier signals; and
    (G) transmitting, with the in-phase and quadrature amplitudes or powers adjusted per the adjusting data, the next plurality of multi-carrier signals through the communications channel.

3. An improvement to a multi-carrier system, comprising:
    a first unit for transmitting, through a communications channel, a plurality of multi-carrier signals on a plurality of frequencies, with the plurality of multi-carrier signals including a subset of unmodulated signals, respectively, including means for generating pre-distorting data including from any of power level, spectral shape, and phase characteristics;
    a second unit for receiving the plurality of multi-carrier signals, and measuring in-phase and quadrature amplitudes or powers, for each received unmodulated carrier signal of the subset of unmodulated carrier signals, for comparing the measured in-phase and quadrature amplitudes or powers of the plurality of received unmodulated carrier signals to predetermined criteria, and for generating adjusting data from the compared in-phase and quadrature amplitudes or powers, and for sending the adjusting data to the first unit; and
    the first unit adjusts, using the adjusting data, in-phase and quadrature amplitudes or powers for a next plurality of the multi-carrier signals to be transmitted, and for transmitting, with the in-phase and quadrature amplitudes or powers adjusted per the adjusting data, the next plurality of multi-carrier signals through the communications channel.

4. An improvement to a multi-carrier system, comprising:
a first unit for transmitting, through a communications channel, a plurality of multi-carrier signals on a plurality of frequencies, with the plurality of multi-carrier signals including a subset of unmodulated signals, respectively;
a second unit for receiving the plurality of multi-carrier signals, and measuring in-phase and quadrature amplitudes or powers, for each received unmodulated carrier signal of the subset of unmodulated carrier signals, for comparing the measured in-phase and quadrature amplitudes or powers of the plurality of received unmodulated carrier signals to predetermined criteria, and for generating adjusting data from the compared in-phase and quadrature amplitudes or powers, and for sending the adjusting data to the first unit including means for measuring gain flatness and phase linearity; and
the first unit adjusts, using the adjusting data, in-phase and quadrature amplitudes or powers for a next plurality of the multi-carrier signals to be transmitted, and for transmitting, with the in-phase and quadrature amplitudes or powers adjusted per the adjusting data, the next plurality of multi-carrier signals through the communications channel.

5. An improvement to a multi-carrier system, comprising:
first unit means for transmitting, through a communications channel, a plurality of multi-carrier signals on a plurality of frequencies, with the plurality of multi-carrier signals including a subset of unmodulated signals, respectively;
second unit means for receiving the plurality of multi-carrier signals, and measuring in-phase and quadrature amplitudes or powers, for each received unmodulated carrier signals of the subset of unmodulated carrier signals, for comparing the measured in-phase and quadrature amplitudes or powers of the plurality of received unmodulated carrier signals to predetermined criteria, and for generating adjusting data from the compared in-phase and quadrature amplitudes or powers, and for sending the adjusting data to the first unit including means for generating pre-distorting data including any of power level, spectral shape, and phase characteristics;
the first unit means for adjusting, using the adjusting data, in-phase and quadrature amplitudes or powers for a next plurality of the multi-carrier signals to be transmitted, and for transmitting, with the in-phase and quadrature amplitudes or powers adjusted per the adjusting data, the next plurality of multi-carrier signals through the communications channel.

6. An improvement to a multi-carrier system, comprising:
first unit means for transmitting, through a communications channel, a plurality of multi-carrier signals on a plurality of frequencies, with the plurality of multi-carrier signals including a subset of unmodulated signals, respectively;
second unit means for receiving the plurality of multi-carrier signals, and measuring in-phase and quadrature amplitudes or powers, for each received unmodulated carrier signals of the subset of unmodulated carrier signals, for comparing the measured in-phase and quadrature amplitudes or powers of the plurality of received unmodulated carrier signals to predetermined criteria, and for generating adjusting data from the compared in-phase and quadrature amplitudes or powers, and for sending the adjusting data to the first unit including means for measuring gain flatness and phase linearity;
the first unit means for adjusting, using the adjusting data, in-phase and quadrature amplitudes or powers for a next plurality of the multi-carrier signals to be transmitted, and for transmitting, with the in-phase and quadrature amplitudes or powers adjusted per the adjusting data, the next plurality of multi-carrier signals through the communications channel.

* * * * *